(12) United States Patent
Gauss et al.

(10) Patent No.: US 7,721,873 B2
(45) Date of Patent: May 25, 2010

(54) CHAIN LINK FOR A CIRCULATING TRANSPORT OF A MACHINE TOOL, AND DOUBLE END TENONER WITH GUIDE CHAIN FORMED FROM SAID CHAIN LINKS

(75) Inventors: Achim Gauss, Dornstetten/Hallwangen (DE); Peter Rathgeber, Dornstetten (DE)

(73) Assignee: Homag Holzbearbeitungssysteme AG, Schopfloch (DE)

( * ) Notice: Subject to any disclaimer, the term of this patent is extended or adjusted under 35 U.S.C. 154(b) by 648 days.

(21) Appl. No.: 11/632,252

(22) Filed: Jan. 10, 2007

(65) Prior Publication Data
US 2009/0183972 A1   Jul. 23, 2009

(30) Foreign Application Priority Data
Jul. 12, 2006   (EP)   .................... 06014463

(51) Int. Cl.
B65G 21/20   (2006.01)
(52) U.S. Cl. .............. 198/690.1; 198/805; 198/838
(58) Field of Classification Search ............. 198/690.1, 198/805, 850, 851, 852, 853, 838
See application file for complete search history.

(56) References Cited

U.S. PATENT DOCUMENTS

| | | | |
|---|---|---|---|
| 3,544,022 A | 12/1970 | Jones et al. | |
| 3,731,166 A | 5/1973 | Inuzuka et al. | |
| 4,805,764 A | 2/1989 | Van Zijderveld, Jr. | |
| 5,027,942 A * | 7/1991 | Wallaart | 198/805 |
| 5,036,969 A * | 8/1991 | Garbagnati | 198/805 |
| 5,165,527 A * | 11/1992 | Garbagnati | 198/805 |
| 5,176,247 A * | 1/1993 | Counter et al. | 198/831 |
| 5,947,361 A | 9/1999 | Berger et al. | |
| 5,975,277 A * | 11/1999 | Skarlupka | 198/370.04 |
| 6,129,201 A | 10/2000 | Langhans | |
| 6,155,406 A | 12/2000 | Garbagnati | |
| 6,357,574 B1 * | 3/2002 | Eberle et al. | 198/465.4 |
| 6,601,696 B1 | 8/2003 | Van Zijderveld et al. | |
| 6,957,734 B2 * | 10/2005 | Imai et al. | 198/472.1 |
| 7,131,528 B1 * | 11/2006 | Rathgeber et al. | 198/805 |

(Continued)

FOREIGN PATENT DOCUMENTS

DE   863324   1/1953

(Continued)

OTHER PUBLICATIONS

Photographs Which Show Deconstruction and Construction Stages of a Factory for Laminate Flooring.

Primary Examiner—Douglas A Hess
(74) Attorney, Agent, or Firm—Baker Botts L.L.P.

(57) ABSTRACT

The present invention discloses chain links for the circulating transport chain of a machine tool, which comprise: a pair of rollers which determine the direction of circulation of the chain link by way of the direction in which they roll, over the rollers which is or are placed at a distance from the pair of rollers in the direction of circulation of the chain link and draw a plane as they roll against the roller pair; and a transverse guide, guiding the chain link transverse to its direction of circulation and is either free from rollers transverse to the direction of circulation of the chain link between the pair of rollers or has a transverse guide roller.

20 Claims, 6 Drawing Sheets

U.S. PATENT DOCUMENTS

| | | | |
|---|---|---|---|
| 7,156,224 | B2 | 1/2007 | Forster et al. |
| 2004/0262131 | A1 | 12/2004 | Forster et al. |
| 2006/0011093 | A1 | 1/2006 | Jensen et al. |
| 2006/0191774 | A1 | 8/2006 | Verduijn et al. |
| 2008/0265689 | A1 | 10/2008 | Armeit et al. |

FOREIGN PATENT DOCUMENTS

| | | |
|---|---|---|
| DE | 1953529 | 10/1969 |
| DE | 2124022 | 5/1971 |
| DE | 7818570 | 1/1979 |
| DE | 3530075 | 4/1986 |
| DE | 3323344 | 8/1987 |
| DE | 8714840 | 1/1988 |
| DE | 19819383 | 11/1998 |
| DE | 19734357 | 2/1999 |
| DE | 20019316 | 3/2001 |
| DE | 10009331 | 9/2001 |
| DE | 1020311 | 8/2003 |
| DE | 102001010417 | 9/2005 |
| DE | 102004023494 | 12/2005 |
| DE | 202004020855 | 3/2006 |
| DE | 202004020855 U | 3/2006 |
| DE | 202004020943 | 6/2006 |
| DE | 202004020943 U | 6/2006 |
| DE | 102005017223 | 10/2006 |
| EP | 0366170 | 5/1990 |
| EP | 0286173 | 7/1995 |
| EP | 0903307 | 3/1999 |
| EP | 0916599 | 5/1999 |
| EP | 1091894 | 4/2001 |
| EP | 1479944 | 11/2004 |
| EP | 1595825 | 11/2005 |
| EP | 1714923 | 10/2006 |
| FR | 1575432 | 7/1969 |
| GB | 1575432 | 9/1980 |
| JP | 03093501 | 4/1991 |
| JP | 2002019944 | 1/2002 |
| WO | WO01/14225 | 3/2001 |
| WO | WO2004/011351 | 2/2004 |
| WO | WO2004/052759 | 6/2004 |
| WO | WO2004052759 | 6/2004 |
| WO | WO2006/087274 | 8/2006 |

* cited by examiner

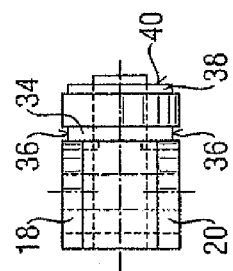
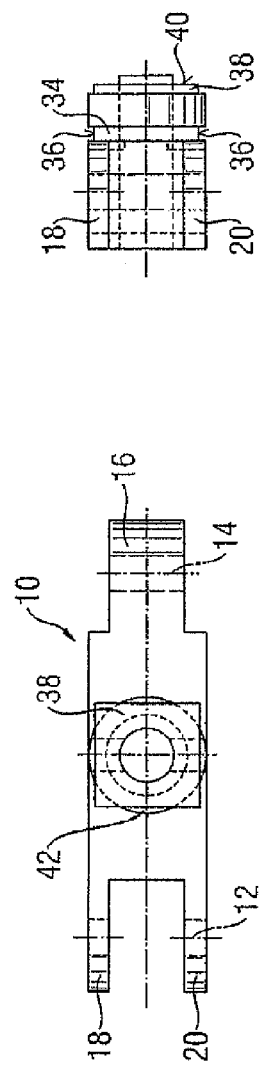
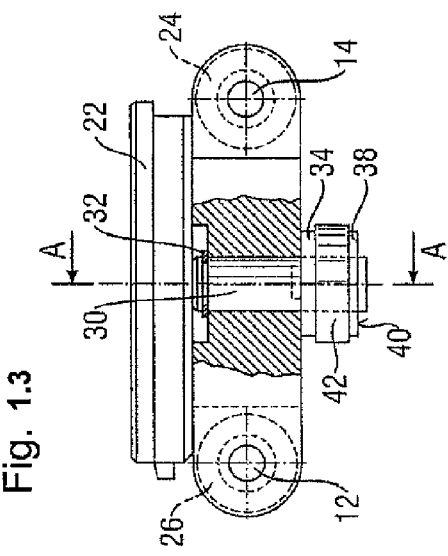
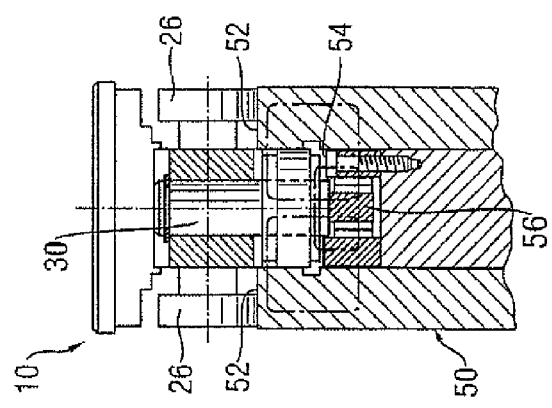

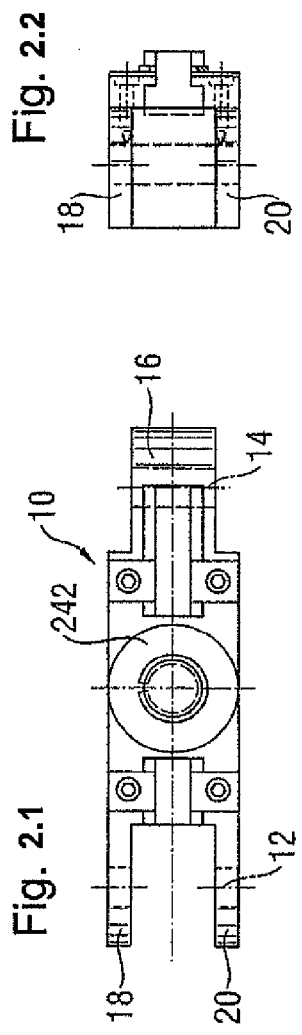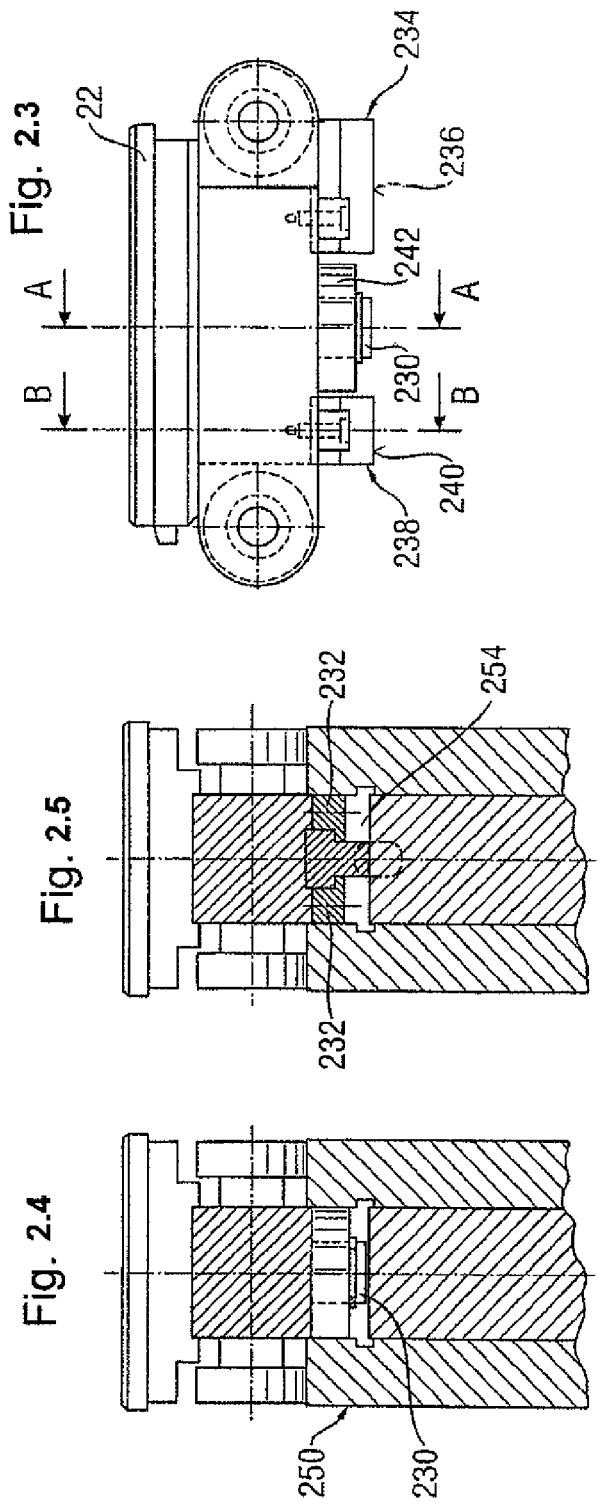

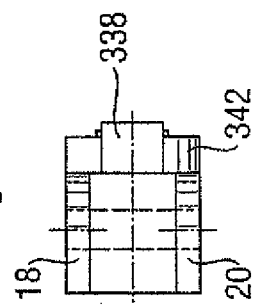
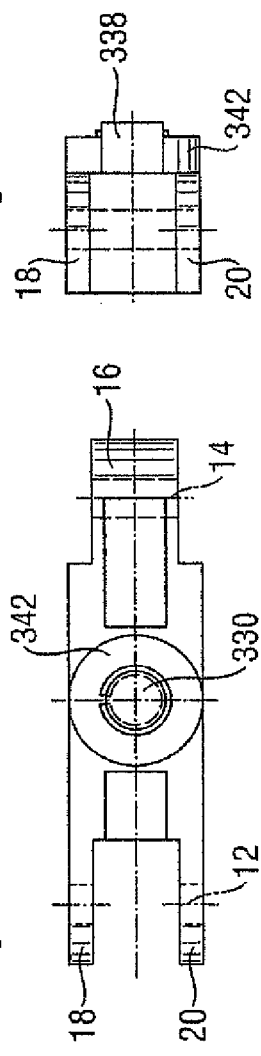
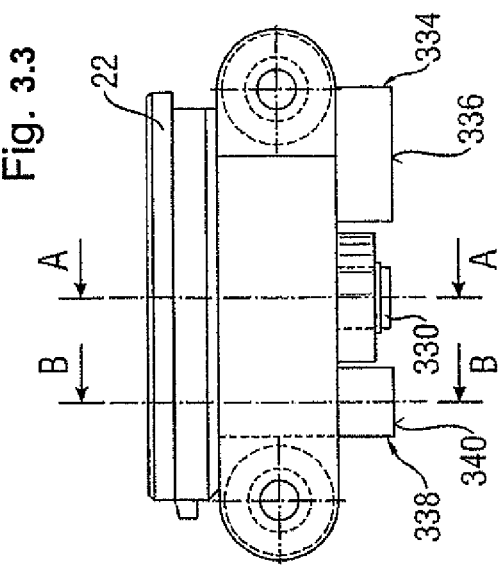
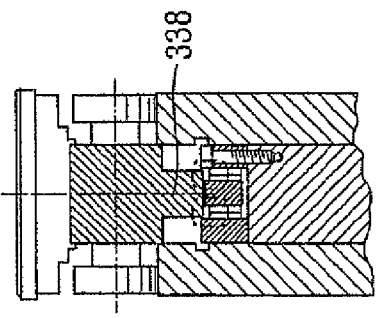
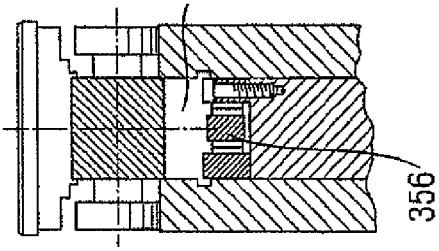
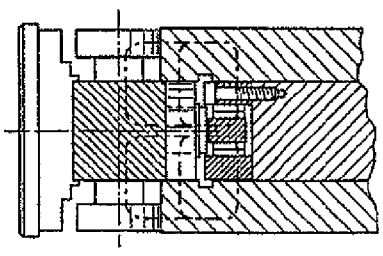

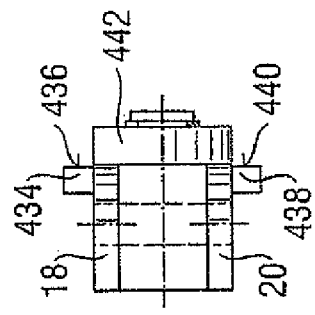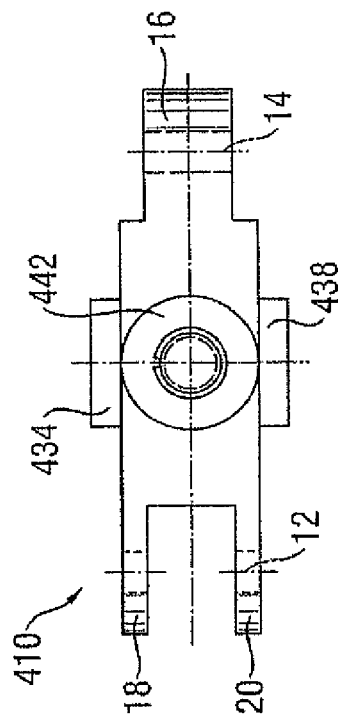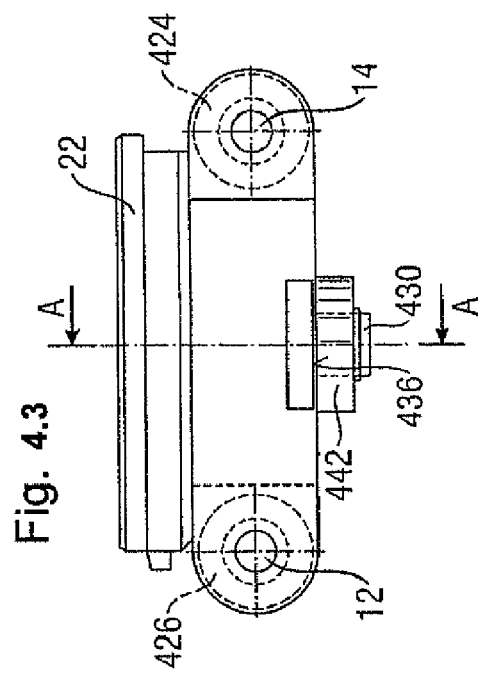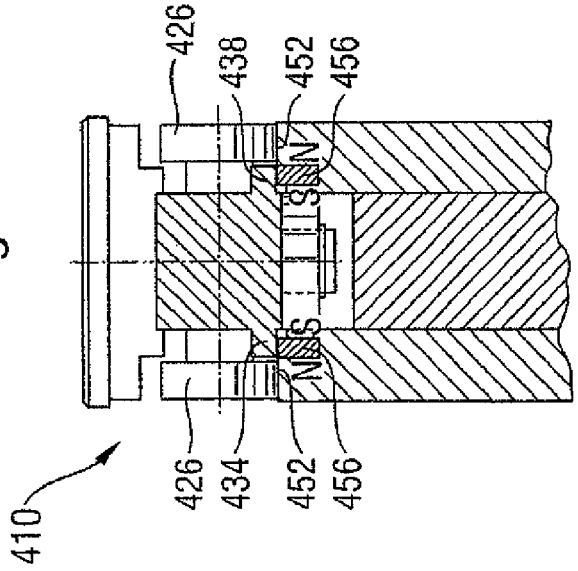

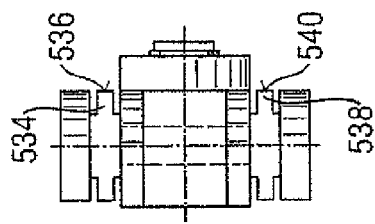
Fig. 5.2
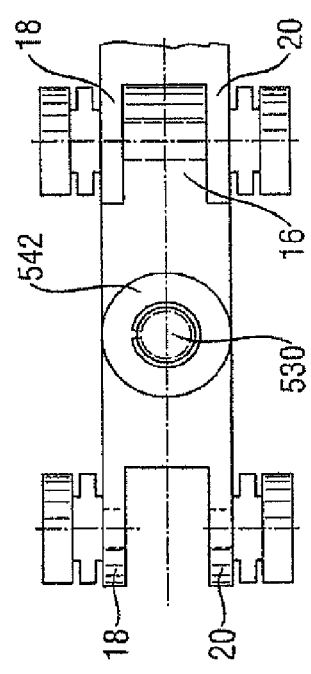
Fig. 5.1
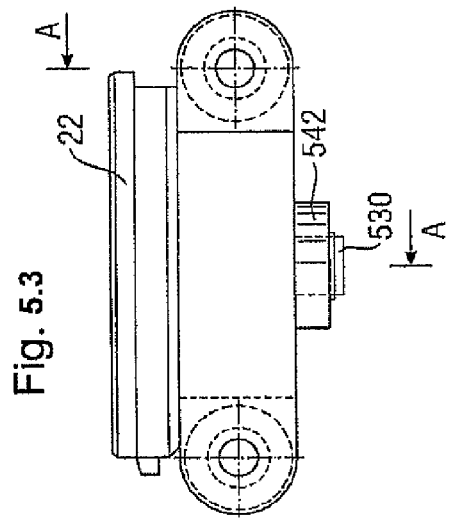
Fig. 5.3
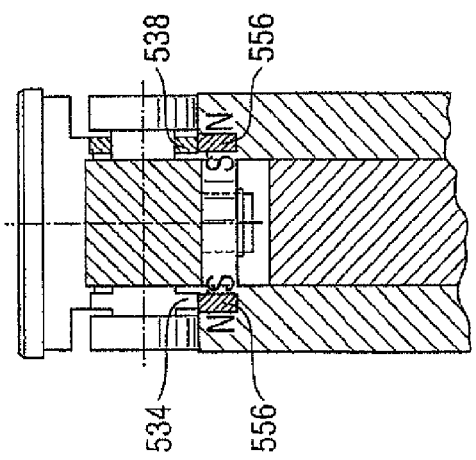
Fig. 5.4

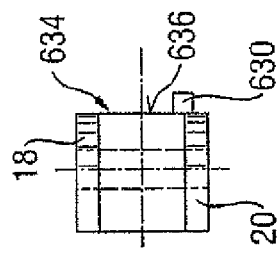
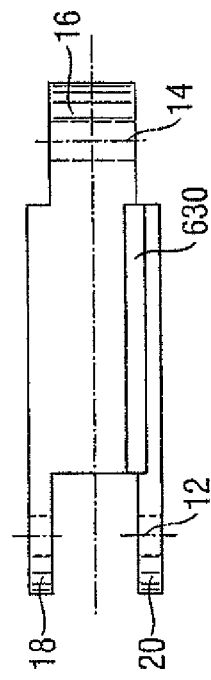
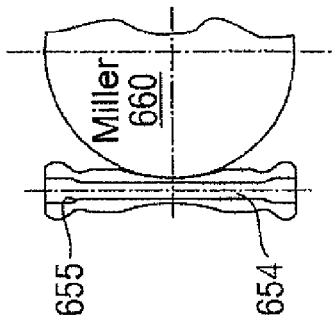
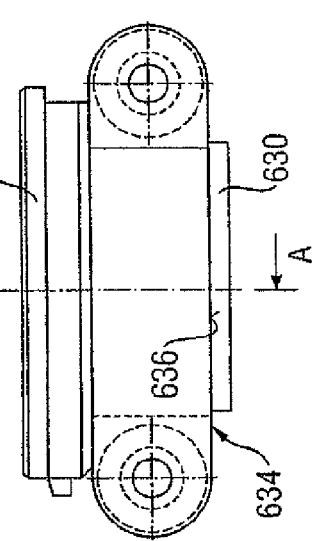
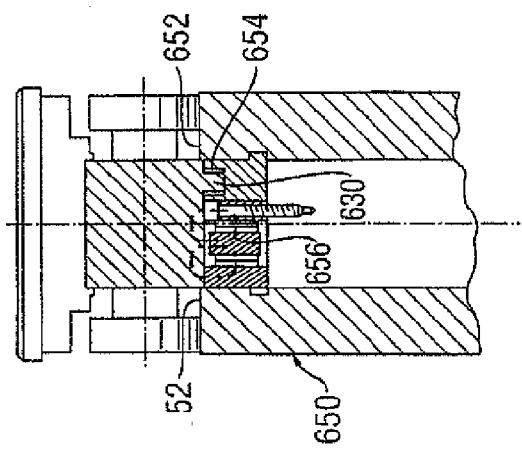

CHAIN LINK FOR A CIRCULATING TRANSPORT OF A MACHINE TOOL, AND DOUBLE END TENONER WITH GUIDE CHAIN FORMED FROM SAID CHAIN LINKS

CROSS-REFERENCE TO RELATED APPLICATIONS

This application claims priority to European patent application no. 06014463, filed Jul. 12, 2006, the disclosure of which is incorporated herein by reference in its entirety.

TECHNICAL FIELD

The present invention relates to a chain link for an endlessly circulating workpiece transport chain and to a continuous process machine used in the machining by chip removal of flat workpieces of wood, plastic or comparable materials, for instance a double end tenoner with one or two guide chains made from said chain links as a circulating workpiece support.

PRIOR ART

EP 1 479 944 A2 (Siemens Aktiengesellschaft) discloses a guide for a circulating transport chain built up of individual chain links. In this prior art the problem was identified that, because of the spring preload on the previously known chains, vibrations or oscillations occur which are perceived detrimentally because of the generation of impact, noise and wear on the chains and their return devices. To reduce or avoid these problems it is suggested that means be provided to generate a magnetic field to exert a magnetic force on the transport chain in such a way that the transport chain is either pressed against or drawn towards its guide device. The guide comprises guide lands on which guide wheels or the rollers for the chain links roll, thus making a track. A magnetic circuit is formed by reducing the width of the guide lands on one side to generate the magnetic force. In this way, magnets can be fitted here, i.e. to one side. This preserves the maximum possible amount of the track width. The resulting magnetic force acts parallel to the axes of the guide wheels or rollers, which have only linear contact with the track. The result is a magnetic force direction which is inadequate in respect of its damping of vibrations. Furthermore, it has become clear that the provision of magnets in the area of the slot between the guide wheels and the track leads to increased frictional corrosion in long term operation (also known as fretting corrosion), which makes more frequent replacement of the components concerned necessary. This is unsatisfactory in remedying the disadvantage of wear and the accompanying replacement of the worn components originally addressed.

The prior art disclosed in DE 10 2004 023 494 A1 (Homag Holzbearbeitungssysteme AG) proposes an improved solution by comparison. It addresses woodworking machines with high speed transport chains and sets itself the problem of creating a chain guide for such machines in which the magnetic forces achieve good levels of vibration damping. To this end, the chain guide should be embodied in such a way that the magnetic forces acting in the air gap act substantially at right angles to the tracks of the guide lands for the guide wheels or rollers for the chain links. This is intended to efficiently prevent the chain links lifting from the track, which is here held to be the cause for the wear previously identified in EP 1 479 944 A2. This direction of force is achieved by not arranging the magnets in the guide lands forming the track, but in the bed of the groove profile they form. Thus the magnets act via a transverse guide roll mounted on an axle pin beneath the track rollers. Even in the solution according to DE 10 2004 023 494 A1, however, the magnetic circuit closes by way of a linear contact, here between the transverse guide roll and the inner sides of the load carrying rails known as guide lands or on the outer circumference of the end face of the axle pin. Furthermore, the solution according to DE 10 2004 023 494 A1 requires that a grooved profile be present.

UNDERLYING PROBLEM

Starting from this prior art, the technical problem underlying the present invention is to provide a solution for the high speed transport chains on woodworking machines with an improved magnetic flux with respect to the magnetic force generated and a reduced risk of fretting corrosion.

SUMMARY OF THE INVENTION

This technical problem is solved by chain links having the features as disclosed herein, and by a continuous throughfeed machine, preferably a double end tenoner, with the features as disclosed herein. Advantageous developments are described in the dependent claims.

The chain link according to the invention embraces a pair of rollers which determine the direction of circulation of the chain link by means of their direction of rolling around typically one chain guide on a machine tool. The circulating transport chain which acts as a workpiece support circulates in a plane that is perpendicular to the transport chain of the workpiece. Machine tool here refers to machines for processing materials such as wood, plastic, aluminum or other materials that exert a comparable stress on the tool, notwithstanding whether this relates to stationary working or working in a continuous process.

A workpiece support is provided over the rollers. At least one further roller is located at a distance in the direction of circulation of the chain link, i.e. from the front to the rear, from the pair of rollers. In this way, the rollers ensure stability against tipping around the transverse axis. The, at least one, further roller and the roller pair when rolling together draw a plane that acts as a reference plane for the disposal of one or a plurality of surfaces to create an improved air gap. A guide, guiding the chain link transversely to its direction of circulation, is also provided. It may have a transverse guide roll or be roller-free transverse to the direction of circulation of the chain link between the pair of rollers.

Observed in the direction of circulation, with roller-free transverse guidance between the pair of rollers and the at least one further roller, a ferromagnetic material is provided forming a surface substantially parallel to the plane formed by the rollers and disposed at a distance from this plane in such a way that a two-dimensional air gap is formed there when the transport chain is in operation. The gap may be downwards, if the chain guide has a guide groove. In the absence of a guide groove of this kind, the surface is a little way above, so that a tight, two-dimensional, parallel air gap is formed with the neighboring surface of the chain guide in the inset in the chain link. This embodiment suggests itself if, rather than a roller, a blade is provided as a transverse guide.

Alternatively, if a transverse roller is used, a ferromagnetic material is provided between the pairs of rollers observed in the direction of circulation, forming at least one surface at a distance from the end face of the axle pin for the transverse guide roller substantially parallel to the plane formed by the rollers and disposed at a distance from this plane in such a way that a two-dimensional air gap is formed there when the transport chain is in operation. This surface or these surfaces can be at a distance from the axle pin in the direction of circulation, but they can also surround it radially, but at a distance from it so that a two-dimensional parallel air gap is also formed at the end face of the axle pin. However, the air gap is spatially separated from the points where the chain links revolve, which reduces the possibility of fretting corrosion. According to the invention, the chain links in the present invention are used in continuous-throughfeed machines because of the predominantly series production involved, the high feed velocity of the workpieces through the machine and the influence of the lower circulating workpiece support on the quality of processing previously considered significant. The circulating transport chain which acts as a workpiece support here also circulates in a plane that is perpendicular to the transport chain of the workpiece. The previous requirement of synchronous running of the support or the right-hand and left-hand supports can be reduced with the help of the invention. With the improved vibration behavior, there is also less significance in the synchronization of the left-hand and right-hand support, as long as the parallelism of the workpiece transport is ensured. This is a noticeable advantage in the processing of workpieces with inkjet printers, for example, such that if the chain links according to the invention are used for the transport of the workpiece in inkjet or other print stations, the matrix spacing of the print is effectively ensured.

BRIEF DESCRIPTION OF THE DRAWINGS

FIG. 1 shows a first embodiment, in which

FIG. 1.1 shows it in bottom view, and the rollers are omitted to simplify the illustration.

FIG. 1.2 shows the first embodiment in an end view.

FIG. 1.3 shows the first embodiment with rollers in a side view, with the chain link according to the invention being partially cut away to show the fastening of a transverse roller on the axle pin and the fastening of the axle pin in the chain link according to the invention.

FIG. 1.4 shows the chain link according to the invention of the first embodiment along the section line A-A from FIG. 1.3 interacting with the chain guide of a machine tool and the magnet package mounted there.

FIG. 2 shows a second embodiment, in which

FIG. 2.1 shows the second embodiment in bottom view with the rollers omitted to simplify the illustration.

FIG. 2.2 shows the second-embodiment in an end view.

FIG. 2.3 shows the second embodiment in a side view, with the rollers illustrated here.

FIG. 2.4 shows the chain link according to the invention of the second embodiment in the section plane of the transverse roller along the section line A-A from FIG. 2.3 interacting with the chain guide of a machine tool and the magnet package mounted there.

FIG. 2.5 shows a section view along the section line B-B in FIG. 2.3 with permanent magnet attached to the chain link according to the invention.

FIG. 3 shows a third embodiment, in which

FIG. 3.1 shows the third embodiment in bottom view and the rollers have been omitted to simplify the illustration.

FIG. 3.2 shows the third embodiment in an end view.

FIG. 3.3 shows the third embodiment in a side view, with the rollers illustrated here.

FIG. 3.4 shows the third embodiment of the chain link according to the invention in cross-section, along the section line A-A in FIG. 3.3, and in particular the options for closing a magnetic circuit.

FIG. 3.5 shows the third embodiment of the chain link according to the invention in the section along the line B-B in FIG. 3.3, with the land from FIG. 3.3 being omitted for clarity.

FIG. 3.6 shows the same section line as FIG. 3.5, but with the land. The lines for the magnetic flow across the air gap have been drawn in for the purposes of clarity.

FIG. 4 shows a fourth embodiment, in which

FIG. 4.1 shows the fourth embodiment in bottom view and the rollers have been omitted to simplify the illustration.

FIG. 4.2 shows the fourth embodiment in an end view.

FIG. 4.3 shows the fourth embodiment in a side view with rollers.

FIG. 4.4 shows the chain link according to the invention in the fourth embodiment along the section line A-A from FIG. 4.3 interacting with the chain guide of a machine tool and the magnet mounted there.

FIG. 5 shows a fifth embodiment, in which

FIG. 5.1 shows the fifth embodiment in a bottom view with rollers.

FIG. 5.2 shows the fifth embodiment in an end view.

FIG. 5.3 shows the fifth embodiment in a side view.

FIG. 5.4 shows the chain link according to the invention in the fifth embodiment along the section line A-A from FIG. 5.3 interacting with the chain guide of a machine tool and the magnet mounted there.

FIG. 6 shows a sixth embodiment, in which

FIG. 6.1 shows the sixth embodiment in bottom view and the rollers have been omitted to simplify the illustration.

FIG. 6.2 shows the sixth embodiment in an end view.

FIG. 6.3 shows the sixth embodiment in a side view, with the rollers illustrated here.

FIG. 6.4 shows the chain link according to the invention in the sixth embodiment along the section line A-A from FIG. 6.3 interacting with the chain guide of a machine tool and the magnet mounted there.

FIG. 6.5 shows a schematic plan view of a partial area of the chain guide from FIG. 6.4.

DETAILED DESCRIPTION OF PREFERRED EMBODIMENTS

Preferred embodiments of the present invention are described below in detail with reference to the accompanying drawings. The same or similar reference signs will be used for identical or similar components throughout all the embodiments. A description of identical or similar components will be given only once and is intended to apply for all embodiments unless otherwise described.

FIG. 1 shows the first embodiment. FIG. 1.1 shows a bottom view, in which the chain link can be seen in general at 10. Roller axes 12 and 14 extend transverse to the longitudinal extent of chain link 10 and are only shown schematically here. In order to provide a connection to the neighboring chain links and thus to form a chain, chain link 10 has in the generally known manner at one end a bearing bush 16 and at the other end, two axle journals 18, 20. The axle journals 18, 20 grip around the bearing bush 16 of an adjacent chain link, and so the adjacent chain links are fastened together by way of an axle or shaft for the rollers 24, 26 (FIG. 1.3).

FIG. 1.2 shows a front view of chain link 10, in which it is also possible to identify axle journals 18, 20. The rollers 24, 26 and the workpiece support 22 are clear from FIG. 1.3 which shows a side view of the chain link illustrated in FIG.

1.1. The workpiece support 22 lies above the roller axes 12, 14, here in accordance with the preferred embodiment over the complete rollers 24, 26. In FIG. 1.3, therefore, the workpiece support 22 is located at a distance 'upwards' relative to rollers 24, 26. The location illustrated in FIG. 1.3 corresponds to the location of the chain link in the upper chain strand, during the transportation of the workpiece on a number of workpiece supports 22 of adjacent chain links 10. This orientation and location of the chain link is used here to make referencing the directions easier, so that 'upwards', for instance, means orientation in the direction of the workpiece support. Directional statements such as 'up' or 'down', 'front' or 'back' are not intended to specify an absolute orientation, however.

The linear contact of all four rollers 24, 26 downwards, i.e. in the typical use of the chain links, line contact on chain guides 52, creates a plane which is used as a reference plane for the formation of the air gap. Additionally, rollers 24, 26 rolling together specifies the direction of circulation of the chain link.

The side view of chain link 10 in FIG. 1.3 is partially cut away. It is clear from the cutaway that an axle pin 30 is inserted into chain link 10 as a transverse guide roller. The axle pin may be fitted from above before the workpiece support 22 is fitted or alternatively from below. In the embodiment illustrated, a snapring 32 is used to secure the axle pin, but other means of fastening are possible. Axle pin 30 has an upper axle pin expansion 34 and a lower axle pin expansion 38. Depending on how the axle pin 30 is fastened in chain link 10, either the lower axle pin expansion 38 or the upper axle pin expansion 34 may also be formed in a single piece with the axle pin 30. It is also possible to provide the two expansions 34, 38 as separate components that are then to be non-rotatably fastened to the axle pin 30.

Although this is not expressly illustrated, it is also preferred if axle pin 30 is non-rotatably located in chain link 10, for example by means of a positive joint using a wedge or a non-round cross-section in its upper end. Non-rotable location of axle pin 30 in conjunction with a non-rotatable fastening of the expansions 34, 38 prevents the axle pin expansions rotating relative to the chain link.

The axle pin expansions 34, 38 provide areas on which an air gap forms during operation of the chain. The faces of the upper axle pin expansion 34, on which the air gap forms, are identified as 36, those for the lower axle pin expansion 38 as 40. For simpler reference, the present faces on which an air gap forms during the operation of the chain links are referred to as air gap faces. The axle pin expansions 34, 38 are made in a ferromagnetic material to guide and bundle the lines of the field and thus to increase the magnetic force exercised on the chain link. Tool steel C45Pb complying with EN ISO 4957 is preferred as the ferromagnetic material, although other materials with iron, nickel or cobalt constituents are also conceivable.

It can be seen from the figures, in particular from FIG. 1.1, that the transverse guidance roller 42 carried on the axle pin 30 projects slightly beyond the axle pin expansions 34, 38. This ensures that the transverse guide roller 42 rolls inside the chain guide and thus can exercise its transverse guidance function without the axle pin expansions 34, 38 non-rotatably fastened in the chain link colliding with the chain guide. However, the projection on the transverse guide roller is so slight that only a small gap forms at the air gap faces 36, 40 across which a magnetic circuit is able to close itself without problem. The projection and hence the air gap is between 0.5 and 2 mm, preferably approximately 1.5 mm and more preferably 1.4 mm, which results in an attraction force of around 100 N with conventional magnets.

The location of the chain link in chain guide 50 is illustrated in FIG. 1.4, which shows a section through the central axis of the axle pin 30 following the course of section line A-A in FIG. 1.3.

FIG. 1.4 shows the chain guide 50 which here comprises two guide tracks 52. Between the guide tracks there is a guide groove 54 in the bed of which magnet packages 56 are disposed. In the present embodiment, the magnet packages are bolted down into the bed of the groove, but lateral screws or a screw fitting through the guide tracks 52 or another means of fastening is conceivable, in which a slight distance can be specified between the magnet packages 56 and the groove bed.

FIG. 1 shows that the air gap face 40 is some distance from the axle pin 30, specifically from its end face. It surrounds the axle pin and its end face radially. At the same time, it lies parallel to the plane drawn by the contacts of the roller pairs with their chain guides. At 36 there are further air gap faces running perpendicular to face 40 and parallel to the direction of circulation of the chain link. All three faces 36, 40 form a narrow, two-dimensional and plane-parallel air gap in the typical configuration of the chain guide.

It can be seen from the section view in FIG. 1.4 that the transverse guide roller 42 rolls against the inner side faces of guide track 52. A transverse movement of chain link 10 relative to the chain guide 50 is thus prevented, which ensures a precise and repeatable transport of the workpiece in a generally known manner. FIG. 1.4 also shows in its dashed-dotted line how the magnetic circuit closes via air gap faces 36, 40. Thus the magnetic circuits are closed via the magnets and the lower axle pin expansion on the one hand, and the magnets and the upper axle pin expansion 34 and the guide tracks 52 on the other. By contrast with the prior art, it is no longer necessary to close the magnetic circle via a linear contact as the transverse guide roller 42 rolls against the guide tracks 52. A two-dimensional extension of the magnetic field lines is further effected in a tight parallel gap, which increases the efficiency. This makes it possible to achieve a qualitatively equivalent guidance function with less magnetic force from the magnets. The manufacturing costs can be lowered and handling of the magnets during assembly is made easier. The build-up of frictional corrosion can be reduced by the decoupling of the magnetic circuit from the points of high mechanical loading.

FIG. 2 shows a second embodiment, in which the views of FIGS. 2.1, 2.2, 2.3 correspond to those of FIGS. 1.1, 1.2 and 1.3. FIG. 2.4 shows a section line running through the centre axis of the axle pin 230 for the transverse guide roller 242, along the course of the section line A-A from FIG. 2.3. FIG. 2.5 shows an additional cross-section, corresponding to the course of the section line B-B in FIG. 2.3.

FIG. 2 shows that lands 234, 238 are provided at a distance in front of and behind the transverse guide roller 242 in the direction of the circulation of the chain link. In the embodiment according to FIG. 2, the lands are formed from angle iron pieces 232 and permanent magnets. The permanent magnets also have a surface on which in conjunction with the chain guide 250, specifically with the bed of the guide groove 254, an air gap is formed. The air gap faces of the lands are identified as 236 and 240 accordingly. In the embodiment according to FIG. 2, because the permanent magnets are fitted in the chain links, it is no longer necessary to provide magnet packages in the chain guide. However, a controlled air gap forms between the lands 234, 238 on the one hand and the bed of the guide groove 254 on the other over a considerable length of the chain link. The air gap faces, run parallel to the plane drawn by the guide rollers and are located at a distance from this plane downwards, i.e. away from the workpiece support 22. The distance between the air gap faces 236, 240 to the bed of the guide groove 254 creates the air gap, preferably approximately 1.5 mm and more preferably 1.4 mm.

Similar lands are implemented in the third embodiment in accordance with FIG. 3, with the views as FIGS. 3.1, 3.2 and 3.3 corresponding to the numbered views in FIGS. 1 and 2. FIG. 3.4 shows a cross-section through the centre axis of the axle pin stub 330 for a transverse guide roller in accordance with the course of the section line A-A as shown in FIG. 3.3. FIGS. 3.5 and 3.6 show a comparison of the cross-section along the section line B-B from cut-outs 3.3 once with and once without the lands 334 and 338.

From the comparison of FIGS. 3.4, 3.5 and 3.6 described below, it is clear how the provision of the lands 234, 238 positively influence the formation of the magnetic circuit. The comparison is made on the basis of the embodiment in accordance with FIG. 3, but is also correct for the other embodiments.

As FIG. 3.4 shows, without the lands 234, 238 it is impossible to clearly forecast whether the magnetic circuit will close itself through the linear contact between transverse guide roller 342 and guide tracks 352, and/or via the end face of axle pin 330, which here only takes the form of a projection on the chain link. The two possible magnetic circuit lines are illustrated in FIG. 3.4. Their common feature is that the magnetic circuit has to close itself over a diverging air gap, which is narrowest at the linear contact between roller and its bearing surface or at the outer circumference of the axle pin end face. This form of air gap results in saturation losses.

FIG. 3.5 reveals that there is also clearance between the chain link and the magnet package 356 that is too great to close the magnetic circuit over a considerable length of the chain link in the direction of circulation of the chain link, that is, where there are no lands. This area remains unused for closing the magnetic circuit, while the chain link runs past the magnet packages in operation.

FIG. 3.6 shows that filling up these sections with lands 334, 336 causes the magnetic circuits to be closed over the air gap faces 336, 340 and thus increases the effective length over which the magnetic packages 56 of each individual chain link can be guided. The air gap can also take a two-dimensional, narrow and parallel form, which reduces saturation losses. The materials provided to make the lands 334, 336 and the dimensions of the air gap correspond to those of the first embodiment.

In the fourth embodiment, too, the views of FIGS. 4.1, 4.2 and 4.3 correspond to those of the correspondingly numbered drawings for the previous embodiments. The fourth embodiment makes particularly clear that the magnetic guidance function for the chain links can also be realized if the magnet packages 456 are built into the guide tracks 452 of the chain guide 450 (see FIG. 4.4). FIG. 4.4 indicates the polarity, with the poles being identified as "N" for north and "S" for south.

Lands 434, 438 are provided to the side of the transverse guide roller 442 above the axle pin 430 to achieve a controllable air gap in this embodiment. To create a tight air gap with magnet packages 456 closing flush with the guide tracks 452, the lands 434, 438 preferably also close practically flush with the outer circumference of the rollers 424, 426. The concrete disposal and embodiment of the lands will depend, however, on the embodiment of the chain guide 450. This means that as long as the magnet packages 456 are disposed offset relative to the guide tracks 452 upwards or downwards, the lands 434, 438 are also embodied correspondingly offset upwards or downwards. Whatever the precise location of these lands 434, 438 relative to the upper surface of the magnet packages 456, air gap faces 436, 440 are formed on them, as can be seen from the drawing. In the embodiment in accordance with FIG. 4 the lands 434, 438 take the form of side projections from the body of the chain link 410 in the area of the transverse guide roller 442, however, a longer extension of the length of the lands or their attachment to a different section of the chain links is possible.

The embodiment in accordance with FIG. 5, in particular FIG. 5.4, shows variants on the principle of the embodiment in accordance with FIG. 4. FIGS. 5.1, 5.2 and 5.3 correspond in their views to the views of the correspondingly numbered drawings for the previous embodiments so that no detailed description is necessary.

FIG. 5.4 shows a sectional view following section line A-A from FIG. 5.3, with the line of the section being offset unlike in the previous embodiments.

FIG. 5.4 shows two different variant embodiments, one to the left of the centre vertical, one to the right of the centre vertical. Both embodiments have in common with the fourth embodiment in accordance with FIG. 4 and with one another that lands 534, 538 are formed. In the fifth embodiment in accordance with FIG. 5, the lands are however, not disposed adjacent to the transverse guide roller 542, but at a distance from this in the direction of travel of the chain link. In the fifth embodiment, the axes for the rollers 524, 526 are used to provide either an expansion of the axle pin 534 or a shoulder on the axle pin 538. Air gap faces 536, 540 are provided at both the axle pin expansion 534 and the axle pin shoulder 538 that are comparable in their technical effect with the air gap faces in the embodiment in accordance with FIG. 4.

The axle pin expansion 534 is formed from a single piece with the roller carrier on the side of axle pin expansion 534. The axle pin shoulder 538 on the other hand, takes the form of a separate component and is fastened non-rotatably to the carrier for the roller on one side by means of a keyed joint, for instance. The provision of an axle pin expansion 534 and an axle pin shoulder 538 on the same axis makes it possible to fit the axis. In this way the axis can be inserted with the axle pin expansion 534 on one end so that the axle pin shoulder 538 can then be mounted on the protruding end. It is however, also conceivable that an axle pin shoulder 538 or an axle pin expansion 534 be fitted on both sides, if it is not a floating axle.

The materials provided to make the axle pin expansion 534 and the axle pin shoulder 538 and the dimensions of the air gap correspond to those of the fourth embodiment.

A further embodiment is illustrated in FIG. 6, with the views shown in FIGS. 6.1, 6.2 and 6.3 again corresponding to the correspondingly numbered views of the previous embodiment.

It can be seen from the embodiment in accordance with FIG. 6 that this version is embodied without a transverse guide roller. Instead of the transverse guide roller familiar from the previous embodiments, the transverse guidance function is provided in the embodiment according to FIG. 6 by a guide blade 630. This makes it possible to embody the chain guide 650 with guide tracks 652 but without the continuous wide guide groove for the transverse guide roller. This for its part makes it possible to use the central area of the chain guide as a rolling surface for a guide roller, which permits the use of chain links with only three guide rollers, for instance.

Instead of having a guide groove for a transverse guide roller, chain guide 650 is provided with a guide groove 654 in which the guide blade 630 is engaged in sections only, that is, in the areas of the machining tools and machining assemblies.

Although it is also possible in principle to provide the guide groove 654 over the entire length of the chain guide 650, this is not necessary, as a transverse guide on the chain is principally required at points where a transverse force is applied to the workpiece and hence to the chain by machine tools or machine assemblies, for instance. In order to reduce possible losses through friction of the guide blade on the guide groove, in the present embodiment the blade is fixed upright but the longitudinal extent of the guide groove 654 is restricted to only this area of the working tools or assemblies. It would also be conceivable, however, that the guide blade be formed to be moveable so that it is moved in engagement with a guide groove or similar only in the areas critical for transverse guidance.

The range critical for transverse guidance is indicated in FIG. 6.5 by a working tool drawn schematically at 660. The guide groove 654 is only provided in the area of the working tool 660. In order to assist in the engagement of the guide blade 630 in the guide groove 654, the groove narrows 655 before the machining tool 660 for the guide blade 630 infeed. A corresponding broadening for the run-out or for the infeed in the event of the reversal of the direction of movement of the chain can also be seen from FIG. 6.5.

Roller-less transverse guidance permits the base of the chain link to be embodied in such a way that the magnetic circuit can close here where a narrow two-dimensional and flat air gap is formed. FIG. 6.4 illustrates the magnet packages 656 correspondingly provided. 634 identifies the base of the chain-link at which an air gap surface 636 is formed. The materials for the base 634 and the dimensions of the air gap correspond to those of the fourth or fifth embodiments.

As before in the previous embodiments, it is also possible in the sixth embodiment to adapt the vertical position of the chain link base 634 to the form of the chain guide. It is preferred that the chain guide 650 is flat on top, i.e. that the upper side of the magnet package 656 is flush with the guide tracks 652. In this case, the base 634 of the chain link and with it the air gap face 636 can be spaced slightly away from the contact point of the rollers in the direction of the workpiece support 622. The distance defines the air gap which then forms with the upper side of the magnet packages 656. If the upper side of the magnetic packages 656 is correspondingly then displaced downwards in relation to the guide tracks 652, the base 634 can be displaced relatively by the same amount. Adapting the chain links to this embodiment of the chain guide 650 thus guarantees the repeatable recreation of a uniform, two-dimensional and parallel air gap.

As can be seen from the description of the preferred embodiments, the individual embodiments can also be combined with one another. For instance, it is possible also to construct the embodiments according to FIGS. 4 and 5 with a roller-less transverse guide. The transverse guide blade described with reference to the embodiment in accordance with FIG. 6 can also be used in the embodiments according to FIGS. 4 and 5, as the lands provided in the embodiments in accordance with FIGS. 4 and 5 leave sufficient space to use a blade instead of the transverse guide roller.

Finally, it is also possible to form the infeed alternatively or additionally from bottom to top instead of the infeed narrowing from the sides into the transverse guidance groove in accordance with the sixth embodiment.

The invention claimed is:

1. A chain link for a circulating transport chain of a machine tool, comprising:
   a first roller connection location configured to receive a pair of rollers, the pair of rollers determine the direction of circulation of the chain link by way of the direction in which they roll;
   a workpiece support disposed above the first roller connection location;
   a second roller connection location configured to receive a third roller, the second roller connection location spaced a distance from the first roller connection location in the direction of circulation of the chain link; and
   a transverse guide which guides the chain link in a direction transverse to the direction of circulation and is roller-free transverse to the direction of circulation of the chain link between the first and second roller connection locations; in which
   a ferromagnetic material is provided between the first and second roller connection locations when viewed in the direction of circulation, the ferromagnetic material forms a surface that is substantially parallel to a plane defined by the rollers and is spaced from this plane in such a way that a flat air gap is formed between the surface and the plane when the transport chain is in operation.

2. The chain link according to claim 1, wherein the transverse guide takes the form of a guide blade.

3. The chain link according to claim 1, wherein the guide blade projects from the plane drawn by the rollers away from the workpiece support.

4. The chain link according to claim 1, wherein the ferromagnetic material is at a distance from the plane drawn by the rollers in the direction of the workpiece support.

5. The chain link according to claim 1, wherein the ferromagnetic material surrounds and is secured to an axle or axle pin or a shaft for the rollers.

6. The chain link according to claim 1, further comprising at least one guide chain configured as a circulating workpiece support.

7. The chain link according to claim 6, wherein the bearing surface for the guide chains is substantially plane, without a groove for a transverse guide roller.

8. The chain link according to claim 6, wherein the bearing surface for the guide chains has a groove for a guide blade along at least part of its length.

9. The chain link according to claim 8, wherein the groove for a guide blade narrows in the area of the machining tools.

10. The chain link according to claim 6, wherein magnets are let into the bearing surface for the guide chains and are finished substantially flush with the bearing surface.

11. The chain link according to claim 6, wherein the bearing surface for the guide chains has a groove for the transverse guide roller in the bed of which magnets are fitted.

12. The chain link according to claim 6, wherein the machine is configured as a double end tenoner with two guide chains formed from chain links.

13. A chain link for a circulating transport chain of a machine tool, comprising:
   a first roller connection location configured to receive a pair of rollers, the pair of rollers determine the direction of circulation of the chain link by way of the direction in which they roll;
   a workpiece support disposed above the first roller connection location;
   a second roller connection location configured to receive a pair of rollers, the second roller connection location spaced a distance from the first roller connection location in the direction of circulation of the chain link; and a third roller connection location configured to receive a transverse guide roller, the external circumference of the transverse guide roller guides the chain link in a direction transverse to the direction of circulation and is mounted on an axle pin, the transverse guide roller located transverse to the direction of circulation of the chain link between the first and second roller connection locations; wherein a ferromagnetic material is provided between the first and second roller connection locations when viewed in the direction of circulation, the ferromagnetic material forms a surface that is at a distance from the end of the axle pin, is substantially parallel to a plane defined by the pair of rollers and is spaced from this plane in such a way that a flat air gap is formed between the surface and the plane when the transport chain is in operation.

14. The chain link according to claim 13, wherein the ferromagnetic material takes the form of a cuboid block located at a distance from the transverse guide roller in the direction of the circulation of the chain link.

15. The chain link according to claim 13, wherein two cuboid blocks are provided that are set at a distance from the transverse guide roller in opposite directions viewed in the direction of circulation.

16. The chain link according to claim 13, wherein the surface is located at a distance in the direction of the workpiece support.

17. The chain link according to claim 13, wherein the ferromagnetic material surrounds the axle pin for the transverse guide roller.

18. The chain link according to claim 17, wherein the ferromagnetic material is formed such that it forms a further surface which runs substantially perpendicular to the plane drawn by the rollers and substantially parallel to the direction of circulation of the chain link and is located at a distance from the external circumference of the axle pin for the transverse guide roller such that a two-dimensional air gap is formed there when the transport chain is running.

19. The chain link according to claim 18, wherein it has two surfaces forming air gaps substantially perpendicular to the plane drawn by the rollers and substantially parallel to the direction of circulation of the chain link.

20. A plurality of chain links configured to be operatively engaged to an adjacent link for a circulating transport chain of a machine tool, comprising:

a first connection location configured to receive a pair of rollers, the pair of rollers determine the direction of circulation of the chain link by way of the direction in which they roll;

a workpiece support disposed above the first connection location;

a second connection location configured to receive a roller which is spaced a distance from the first connection location in the direction of circulation of the chain link;

an axle pin at a third connection location configured to receive a transverse guide roller or a ferromagnetic material;

wherein a first chain link includes a transverse guide roller, the transverse guide roller guiding the first chain link in a direction transverse to the direction of circulation, the transverse guide roller being matingly engaged to the first chain link by the axle pin; and wherein a second chain link includes a ferromagnetic material, the ferromagnetic material secured to the second chain link by the axle pin, the ferromagnetic material disposed a distance from an end of the axle pin to form an air gap between the ferromagnetic material and the rollers at the first connection location.

* * * * *